(12) United States Patent
Hong et al.

(10) Patent No.: US 8,475,738 B2
(45) Date of Patent: Jul. 2, 2013

(54) PHOTOCATALYTIC APPARATUS AND METHOD FOR INJECTING MICROFLUIDIC VOLUMES

(75) Inventors: Jongcheol Hong, Daejeon (KR); Wan Joong Kim, Goyang (KR); Chul Huh, Daejeon (KR); Bong Kyu Kim, Daejeon (KR); Chil Seong Ah, Daejeon (KR); Gun Yong Sung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 124 days.

(21) Appl. No.: 13/100,890

(22) Filed: May 4, 2011

(65) Prior Publication Data

US 2011/0272271 A1    Nov. 10, 2011

(30) Foreign Application Priority Data

Nov. 5, 2010 (KR) .......................... 10-2010-0109686

(51) Int. Cl.
*B81B 1/00* (2006.01)
*B67D 5/00* (2006.01)
*F04F 99/00* (2009.01)

(52) U.S. Cl.
USPC ........... 422/504; 422/502; 422/503; 422/505; 204/157.15

(58) Field of Classification Search
USPC ...................... 204/157.15; 422/504, 505, 502, 422/503
See application file for complete search history.

(56) References Cited

U.S. PATENT DOCUMENTS

| | | | |
|---|---|---|---|
| 6,447,661 B1* | 9/2002 | Chow et al. | 422/504 |
| 7,211,442 B2* | 5/2007 | Gilbert et | 422/504 |
| 7,378,280 B2* | 5/2008 | Quake et al. | 422/504 |
| 7,745,207 B2* | 6/2010 | Jovanovich et al. | 422/504 |
| 7,883,669 B2* | 2/2011 | Sun et al. | 422/504 |
| 8,323,982 B2* | 12/2012 | Leboeuf et al. | 204/157.15 |
| 2002/0179445 A1* | 12/2002 | Alajoki et al. | 204/451 |
| 2008/0135397 A1* | 6/2008 | Ehrfeld et al. | 204/157.15 |
| 2010/0182868 A1* | 7/2010 | Woehl | 422/186 |
| 2012/0107195 A1* | 5/2012 | Kim | 422/502 |

OTHER PUBLICATIONS

Harbour et al, "Photogeneration of hydrogen peroxide in aqueous TiO2 dispersions," Can. J. Chem. vol. 63, pp. 204-208 (1985).*
Definition of "solvent," (Hawley's Condensed Chemical Dictionary, 14th ed., copyright 2002 John Wiley & Sons, Inc.).*
Jason W. Munyan et al., "Electrically actuated, pressure-driven microfluidic pumps", Lab on a Chip, Oct. 2003, pp. 217-220, vol. 3, The Royal Society of Chemistry.
Lidong Qin et al., "Self-powered microfluidic chips for multiplexed protein assays from whole blood", Lab on a Chip, Apr. 2009, pp. 2016-2020, vol. 9, The Royal Society of Chemistry.

* cited by examiner

*Primary Examiner* — Keith Hendricks
*Assistant Examiner* — Colleen M Raphael

(57) ABSTRACT

Provided is a microfluidic injection device and a method for injecting microfluidic. The microfluidic injection device includes a fluid injection chamber, a gas generation chamber applying pressure to the fluid injection chamber, and a channel connecting the fluid injection chamber to the gas generation chamber.

9 Claims, 3 Drawing Sheets

PHOTOCATALYTIC APPARATUS AND METHOD FOR INJECTING MICROFLUIDIC VOLUMES

CROSS-REFERENCE TO RELATED APPLICATIONS

This U.S. non-provisional patent application claims priority under 35 U.S.C. §119 of Korean Patent Application Nos. 10-2010-0042061, filed on May 4, 2010, and 10-2010-0109868, filed on Nov. 5, 2010, the entire contents of which are hereby incorporated by reference.

BACKGROUND OF THE INVENTION

The present invention disclosed herein relates to a device and a method for injecting microfluidic.

A biochip, a medical cartridge, or the like includes an infinitesimal amount of fluid or reagent. A microfluid injection device is used for the biochip or the medical cartridge. An external pump may be used for the microfluidic injection device to transfer fluids. The external pump may directly inject fluids or may obtain pressure for transferring fluids by applying air pressure. Or, the microfluidic injection device may perform the fluid transfer operation including a structure for performing a pumping operation.

In the case that the biochip or the medical cartridge is disposable, a method for connecting a fluid channel in the microfluidic injection device to an external fluid channel without a leakage of fluids is needed to perform the fluid transfer operation by directly injecting fluids using the external pump of the microfluidic injection device or applying air pressure. However, when the disposable biochip or the medical cartridge is continuously connected and disconnected, it is difficult to connect the channels without the fluid leakage and the fluid leakage may occur due to damage of a connecting structure.

In the case that the microfluidic injection device performs the fluid transfer operation including the pumping structure, an electrical method and a chemical method may be used for transferring fluids. In the case that The microfluidic injection device uses electricity as an energy source, a structure corresponding to an electrode is inserted to the biochip or the medical cartridge so that pressure of gas generated due to electrolyzation may be used or electro-osmosis may be used. However, according to this method, the electrode should be inserted when the biochip or the medical cartridges is manufactured so that manufacturing processes are complicated and manufacturing cost may be increased.

Meanwhile, according to the chemical method, a solution which is decomposed into gas such as oxygenated water is previously injected into the biochip or the medical cartridge, and then, a portion where the solution is included is pierced by a metal needle acting as a catalyst such as platinum so that gas generating reaction is induced and the fluid transferring pressure is obtained. According to the chemical method, strength of materials of the biochip or the medical cartridges is limited. Further, since the metal needle should be moved, in the case of making an automated biochip or cartridge analysis system, the system is complicated and a frequency of malfunction and failure is high.

SUMMARY OF THE INVENTION

The present invention provides a simplified microfluid injection device and a method for injecting microfluidic.

Embodiments of the present invention provide microfluid injection devices including a fluid injection chamber, a gas generation chamber applying pressure to the fluid injection chamber, and a channel connecting the fluid injection chamber to the gas generation chamber.

In some embodiments, the gas generation chamber may accommodate a photocatalyst and a solvent.

In other embodiments, the photocatalyst may include titanium dioxide and the solvent may include hydrogen peroxide.

In still other embodiments, the photocatalyst may decompose the hydrogen peroxide being irradiated by ultraviolet light, and an oxygen gas is generated in the gas generation chamber.

In even other embodiments, the microfluidic injection device may further include an auxiliary chamber accommodating the photocatalyst and the solvent, and an auxiliary channel connecting the gas generation chamber to the auxiliary chamber, wherein the auxiliary chamber prevents the solvent accommodated in the gas generation chamber from passing through the channel.

In yet other embodiments, the microfluidic injection device may further include an optical irradiator irradiating light to the gas generation chamber.

In further embodiments, the gas generation chamber may accommodate a promoter delaying recombination of a pair of electron and hole.

In other embodiments of the present invention, methods for injection mictrofluids include preparing a microfluid injection device including a fluid injection chamber, a gas generation chamber applying pressure to the fluid injection chamber, and a channel connecting the fluid injection chamber to the gas generation chamber; generating a gas by irradiating light to the gas generation chamber; and injecting a fluid accommodated in the fluid injection chamber.

In some embodiments, the gas generation chamber may accommodate a photocatalyst and a solvent.

In other embodiments, the generating the gas by irradiating light to the gas generation chamber may include decomposing the solvent by the photocatalyst irradiating ultraviolet light to the gas generation chamber.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
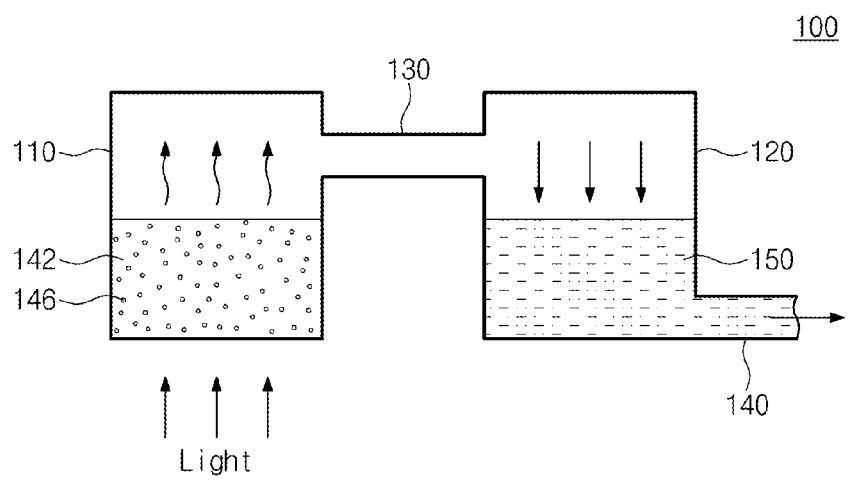
FIG. 1 is a diagram illustrating a microfluid injection device according to an embodiment of the present invention.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Like reference numerals refer to like elements throughout. In the drawings, exemplary regions are schematically illustrated, and shapes of the regions are not for limiting the present invention but for exemplifying particular forms. The embodiments exemplified and described in this disclosure include their complementary embodiments.

The terms used in this disclosure are not for limiting the present invention but for explaining the embodiments. As used herein, the term "and/or" includes any and all combinations of one or more of the associated listed items. The meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, it will be described about an exemplary embodiment of the present invention in conjunction with the accompanying drawings.

FIG. 1 is a diagram illustrating a microfluid injection device according to an embodiment of the present invention.

Referring to FIG. 1, a microfluid injection device 100 according to the embodiment of the present invention includes a fluid injection chamber 120, a gas generation chamber 110 applying pressure to the fluid injection chamber 120, and a channel 130 connecting the fluid injection chamber 120 to the gas generation chamber 110.

The fluid injection chamber 120 accommodates a fluid 150. The fluid 150 may be, e.g., a medical reagent for examining biomaterials. The fluid injection chamber 120 is connected to a transfer channel 140 through which the fluid 150 is transferred. The gas generation chamber 110 may accommodate a photocatalyst 146 and a solvent 142. The solvent 142 is decomposed by the photocatalyst 146, and thus, a gas is generated in the gas generation chamber 110 and pressure in the gas generation chamber 110 and the fluid injection chamber 120 is increased. Therefore, the fluid 150 is extruded through the transfer channel 140.

A principle of generating gas in the gas generation chamber 110 is as follows. The gas may be generated by irradiated light in the gas generation chamber 110. The gas generation chamber 110 may be composed of a transparent material for the light to pass the gas generation chamber 110. The photocatalyst 146 in the gas generation chamber 110 absorbs the light so that electrons and holes (pair of electron-hole) are generated. That is, if the light corresponding to an energy band gap of the photocatalyst 146 is irradiated, electrons of a valence band in the photocatalyst 146 absorb the light and are excited to a conduction band where electrons are missed. The generated electrons and holes may oxidize or reduce the solvent.

A chemical reaction, in which a gas is generated by light, may be various. For instance, nitric acid is photolyzed so that nitrogen monoxide and nitrogen dioxide are generated, or hydrogen peroxide or water is decomposed by a titanium dioxide photocatalyst so that oxygen is generated. Liquid inorganic or organic substance such as water, alcohol, and hydrogen peroxide or their mixtures may be used as the solvent 142. The irradiated light may include light of all wavelengths (infrared light, visible light, and ultraviolet light).

In detail, the photocatalyst 146 may include titanium dioxide. The titanium dioxide may be in a particle form or may be coated on a particle surface. The solvent 142 may include hydrogen peroxide. If ultraviolet light is irradiated to the photocatalyst 146 which is titanium dioxide, a pair of electron and hole is generated, and thus, the hydrogen peroxide is decomposed and an oxygen gas is generated. The oxygen gas may push the fluid 150 to the transfer channel 140 increasing the pressure in the fluid injection chamber 120. The irradiated ultraviolet light may have a wavelength of about 387.5 nm. The gas generation chamber 110 may further accommodate a promoter for delaying recombination of the pair of electron and hole. The promoter may be platinum (Pt). The oxygen gas generated by the titanium dioxide is chemically relatively stable and may be not well react with the fluid 150. Also, the oxygen gas may be harmless to a user.

The microfluidic injection device according to the embodiment of the present invention may constitute a device for injecting fluids using optical energy. Since the microfluidic injection device has a simple structure, a frequency of malfunction or failure may be minimized. Also, since the microfluidic injection device may be manufactured in an injection molding method using transparent plastic, a manufacturing cost may be reduced.

Figure 2:
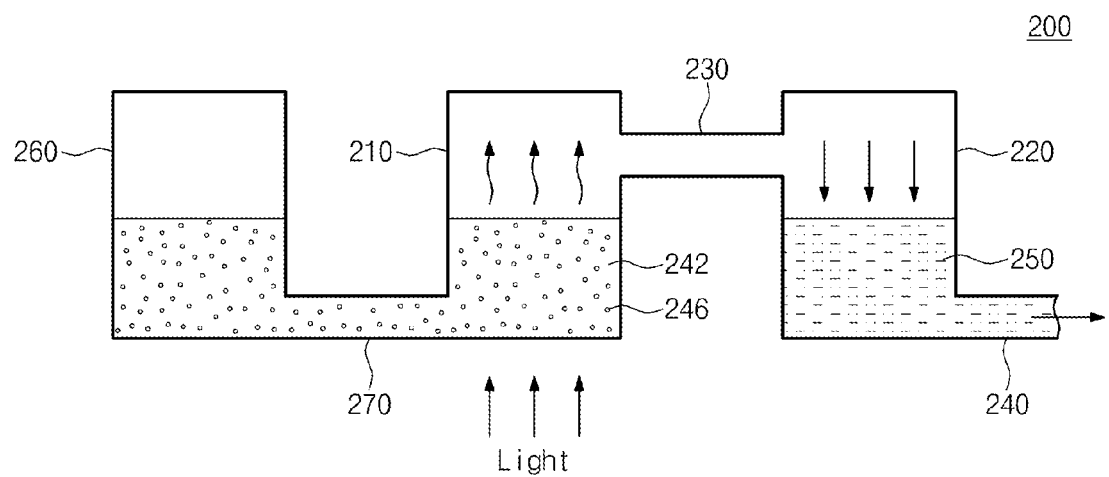
FIG. 2 is a diagram illustrating a microfluid injection device according to another embodiment of the present invention.

FIG. 2 is a diagram illustrating a microfluid injection device according to another embodiment of the present invention. The technical feature described referring to FIG. 1 is omitted for conciseness.

Referring to FIG. 2, a microfluid injection device 200 according to the other embodiment of the present invention includes a fluid injection chamber 220, a gas generation chamber 210 applying pressure to the fluid injection chamber 220, and a channel 230 connecting the fluid injection chamber 220 to the gas generation chamber 210. The microfluidic injection device 200 further includes an auxiliary chamber 260. The auxiliary chamber 260 is connected to the gas generation chamber 210 by an auxiliary channel 270. The gas generation chamber 210 may accommodate a photocatalyst 246 and a solvent 242. The auxiliary chamber 260 accommodates the photocatalyst 246 and the solvent 242 like the gas generation chamber 210. The auxiliary chamber 260 may prevent the solvent 242 in the gas generation chamber 210 from passing through the channel 230. That is, the auxiliary chamber 260 may prevent the solvent 242 from overflowing to the channel 230.

The fluid injection chamber 220 accommodates a fluid 250. The fluid 250 may be, e.g., a medical reagent. The fluid injection chamber 220 is connected to a transfer channel 240 through which the fluid 250 is transferred.

The photocatalyst 246 may include titanium dioxide. The titanium dioxide may be in a particle form or may be coated on a particle surface. The solvent 242 may include hydrogen peroxide. If ultraviolet light is irradiated to the photocatalyst 246 which is titanium dioxide, a pair of electron and hole is generated, and thus, the hydrogen peroxide is decomposed and an oxygen gas is generated. The oxygen gas may push the fluid 250 to the transfer channel 240 increasing the pressure in the fluid injection chamber 220. The gas generation chamber 210 may further accommodate a promoter for delaying recombination of the pair of electron and hole. The promoter may be platinum (Pt). The oxygen gas generated by the titanium dioxide is chemically relatively stable and may be not well react with the fluid 250. Also, the oxygen gas may be harmless to a user.

Figure 3:
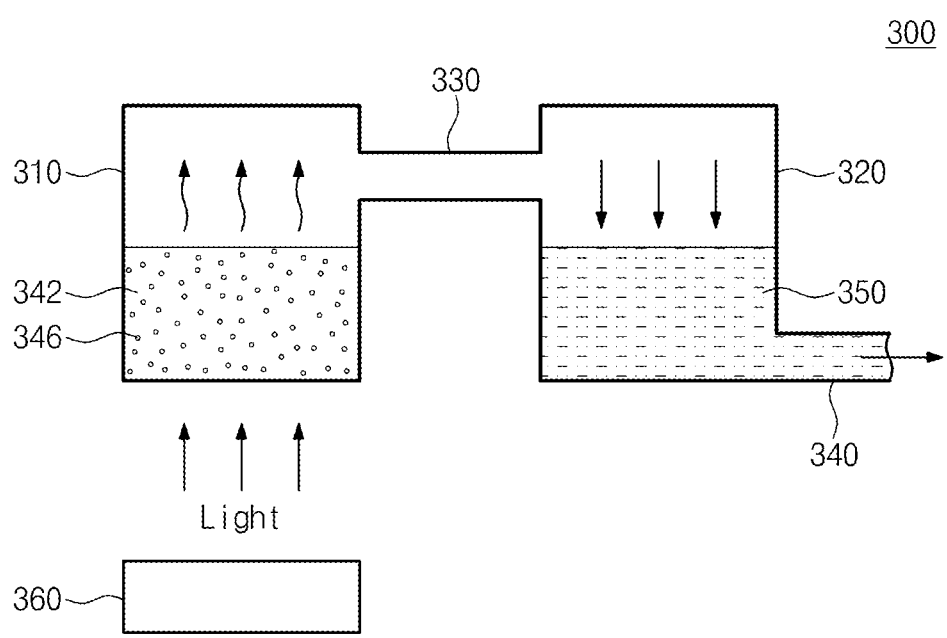
FIG. 3 is a diagram illustrating a microfluid injection device according to still another embodiment of the present invention.

FIG. 3 is a diagram illustrating a microfluid injection device according to still another embodiment of the present invention. The technical feature described referring to FIG. 1 is omitted for conciseness.

Referring to FIG. 3, a microfluid injection device 300 according to the still other embodiment of the present invention includes a fluid injection chamber 320, a gas generation chamber 310 applying pressure to the fluid injection chamber 320, and a channel 330 connecting the fluid injection chamber 320 to the gas generation chamber 310. The microfluidic injection device 300 may further include an optical irradiator 360.

The fluid injection chamber 320 accommodates a fluid 350. The fluid 350 may be, e.g., a medical reagent. The fluid injection chamber 320 is connected to a transfer channel 340 through which the fluid 350 is transferred. The gas generation chamber 310 may accommodate a photocatalyst 346 and a solvent 342. The solvent 342 is decomposed by the photocatalyst 346, and thus, a gas is generated in the gas generation chamber 310 and pressure in the gas generation chamber 310 and the fluid injection chamber 320 is increased. Therefore, the fluid 350 is extruded through the transfer channel 340.

The photocatalyst 346 may include titanium dioxide. The titanium dioxide may be in a particle form or may be coated on a particle surface. The solvent 342 may include hydrogen peroxide. If the optical irradiator 360 irradiates ultraviolet light to the photocatalyst 346 which is titanium dioxide, a pair of electron and hole is generated, and thus, the hydrogen peroxide is decomposed and an oxygen gas is generated. The oxygen gas may push the fluid 350 to the transfer channel 340 increasing the pressure in the fluid injection chamber 320. The ultraviolet light of the optical irradiator 360 may have a wavelength of about 387.5 nm. The gas generation chamber 310 may further accommodate a promoter for delaying recombination of the pair of electron and hole. The promoter may be platinum (Pt). The oxygen gas generated by the titanium dioxide is chemically relatively stable and may be not well react with the fluid 350. Also, the oxygen gas may be harmless to a user.

Figure 4:
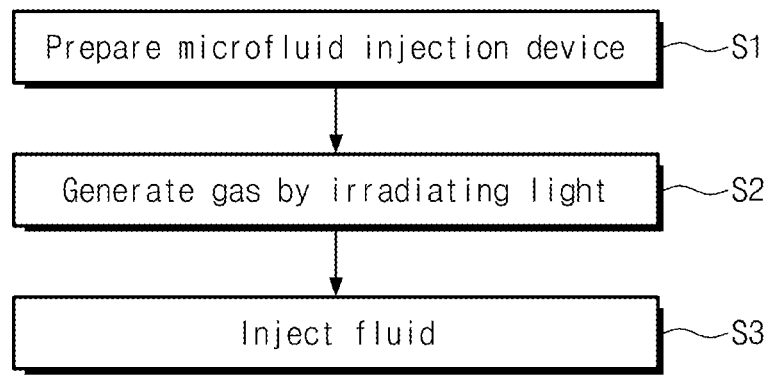
FIG. 4 is a flowchart for explaining a method for injecting microfluidics according to an embodiment of the present invention.

FIG. 4 is a flowchart for explaining a method for injecting microfluidics according to the embodiments of the present invention.

Referring to FIG. 4, the method for injecting microfluidics according to the embodiments of the present invention includes operation S1 for preparing a microfluid injection device including a fluid injection chamber, a gas generation chamber applying pressure to the fluid injection chamber, and a channel connecting the fluid injection chamber to the gas generation chamber, operation S2 for generating a gas by irradiating light to the gas generation chamber, and operation S3 for injecting the fluid accommodated in the fluid injection chamber.

As described above referring to FIGS. 1 to 3, the gas generation chamber may accommodate the photocatalyst and the solvent. Also, The microfluidic injection device may include the auxiliary chamber or the optical irradiator. The photocatalyst may be titanium dioxide, and the solvent may be hydrogen peroxide. The solvent may be decomposed by the photocatalyst when ultraviolet light is irradiated to the gas generation chamber.

According to the embodiments of the present invention, the microfluidic injection device can inject microfluidic using optical energy. Since the microfluidic injection device has a simple structure, a frequency of malfunction or failure can be minimized. Also, since the microfluidic injection device can be manufactured in an injection molding method using transparent plastic, a manufacturing cost can be reduced.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A microfluidic injection device, comprising:
   a fluid injection chamber; a gas generation chamber containing a photocatalyst that absorbs light to generate pairs of electrons and holes to generate a gas using the pairs of electrons and holes, the gas generation chamber being configured to apply the gas to the fluid injection chamber to increase internal pressure of the fluid injection chamber; and
   a coupling channel configured to couple the fluid injection chamber to the gas generation chamber,
   wherein the gas generation chamber contains a promoter to delay recombination of the pairs of electrons and holes, and
   wherein the gas generation chamber is formed of a transparent material for light to pass through the gas generation chamber.

2. The microfluidic injection device of claim 1, wherein the gas generation chamber contains the photocatalyst and a reactant.

3. The microfluidic injection device of claim 2, wherein the photocatalyst comprises titanium dioxide.

4. The microfluidic injection device of claim 3,
   wherein the reactant comprises hydrogen peroxide and the photocatalyst is irradiated by ultraviolet light to generate the pairs of electrons and holes so that the hydrogen peroxide is decomposed using the pairs of electrons and holes and an oxygen gas is generated in the gas generation chamber.

5. The microfluidic injection device of claim 2, further comprising:
   an auxiliary chamber configured to accommodate the photocatalyst and the reactant; and
   an auxiliary channel configured to couple the gas generation chamber to the auxiliary chamber,
   wherein the auxiliary chamber is configured to prevent the reactant accommodated in the gas generation chamber from passing through the coupling channel.

6. The microfluidic injection device of claim 1, further comprising an optical irradiator configured to irradiate the light to the gas generation chamber.

7. A method for microfluidic injection, comprising:
   preparing a microfluidic injection device comprising a fluid injection chamber, a gas generation chamber containing a photocatalyst and configured to increase internal pressure of the fluid injection chamber, and
   a coupling channel configured to couple the fluid injection chamber to the gas generation chamber;
   generating a gas by irradiating light to the photocatalyst in the gas generation chamber to generate pairs of electrons and holes;
   generating, with the photocatalyst in the gas generation chamber, a gas using the pairs of electrons and holes;
   applying, by the gas generation chamber, the gas to the fluid injection chamber to increase internal pressure of the fluid injection chamber; and
   extruding a fluid contained in the fluid injection chamber using the increased internal pressure of the fluid injection chamber,
   wherein the gas generation chamber further contains a promoter to delay recombination of the pairs of electrons and holes.

8. The method of claim 7, wherein the gas generation chamber contains the photocatalyst and a reactant.

9. The method of claim 8, wherein generating the gas comprises decomposing the reactant using the pairs of electrons and holes generated as the photocatalyst is irradiated by ultraviolet light supplied to the gas generation chamber.

\* \* \* \* \*